O. Salgee,
Hose Coupling,
No. 68,656 — Patented Sep. 10, 1867.
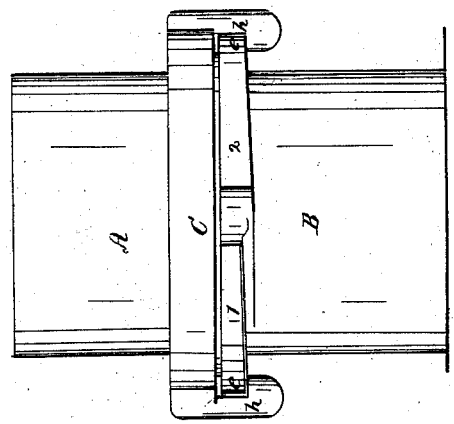
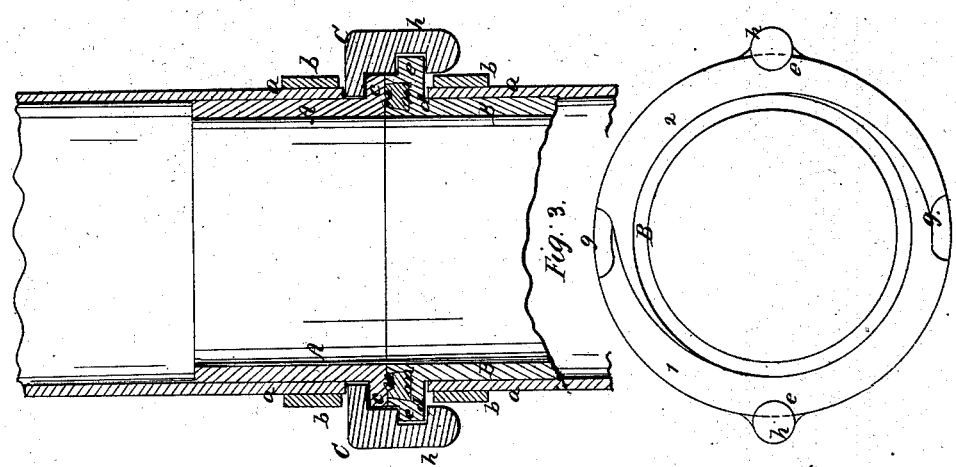
Witnesses:
Theo. Fusch
J. A. Servie
Inventor:
O. Salgee
Per mmy Co.
Attys

United States Patent Office.

OLIVER SALGEE, OF NEW YORK, N. Y.

Letters Patent No. 68,656, dated September 10, 1867.

---

IMPROVEMENT IN HOSE-COUPLINGS.

---

The Schedule referred to in these Letters Patent and making part of the same.

---

TO ALL WHOM IT MAY CONCERN:

Be it known that I, OLIVER SALGEE, of the city, county, and State of New York, have invented a new and useful Improvement in Hose-Coupling; and I do hereby declare that the following is a full, clear, and exact description thereof, which will enable others skilled in the art to make and use the same, reference being had to the accompanying drawings, forming part of this specification, in which—

Figure 1 is a longitudinal central section of my improved coupling.

Figure 2 is a side view of the same.

Figure 3 is an end view of the same.

Similar letters of reference indicate like parts.

The nature of my said invention consists in a ring upon one coupling, having projecting lugs that pass over inclined or cam flanges upon the other part of the coupling, so that the surfaces of said couplings will be brought into contact and held firmly by the said lugs, when they are brought over said flanges by a partial rotation of the said ring. The lugs projecting from said ring allow it to be turned by hand, and seldom require a wrench to be used, and the parts are simple, strong, and durable.

The coupling is made of brass or other suitable metal as usual. A is the tubular part of one piece, and B of the other, upon which tubular parts the hose $a$ is secured by the external metal ring $b$, and fitted together in the ordinary way, as shown in red by fig. 1. The section ends are fitted together exactly, and upon A is a flange, $c$, and upon B is a flange, $d$, both of which form the ends of A and B, and coincide in their peripheries. But on the back part of the flange $d$ is another flange or projection, $e$, the front side of which, next the end of the coupling, forms a square shoulder on the flange $d$ in the plane of a transverse section, that is to say, equidistant from the end all around the coupling. But on two opposite points of the periphery of the flange $e$ are made two notches, $g\ g$, which thus cut the flange into two equal parts, 1–2, as shown in figs. 2 and 3, and each of these divisions forms taper segments or segmental cams by making each of them thinner on the periphery at one end than at the other, so that there is a large end of one cam and a small end of the other at each of the notches $g\ g$, as shown in fig. 2. A clamping-ring, C, is fitted in the ordinary way upon the end of the other part of the coupling A so as to lie snug upon the flanges $c\ d$, and against the shoulder of the flange $e$, as shown in fig. 1. On opposite sides of the ring C are bosses or arms $h\ h$, which project forward and lap over the cams 1–2 on the flange $e$, and which slip over the cams by passing through the notches $g\ g$ which separate the cams.

In the end of one of the sections of the coupling B is made a deep and broad dove-tailed annular groove, within which is fitted an India-rubber or other packing, $m$, which fills the groove completely, and is flush with the face of the section, and on the end of the other section A is made an annular bead projection, $n$, in turning the metal, which sinks into the rubber packing $m$ in the annular groove, when the ends of the coupling are brought together by means of the clamping-ring C, which is turned partly around so that the bosses $h\ h$ rise on the inclines on the cams 1–2 of the flange $e$, as shown by all the figures in different aspects.

Having thus described my invention, what I claim and desire to secure by Letters Patent, is—

A hose-coupling formed with inclined or cam flanges upon one part of the coupling, in combination with a movable ring surrounding the other part of the coupling, and provided with lugs taking over said inclined flanges in the manner specified, to bring the surfaces of the couplings together, as set forth.

OLIVER SALGEE.

Witnesses:
HENRY C. BANKS,
JOHN WM. BROWN.